US012763920B2

(12) United States Patent
Suzuki et al.

(10) Patent No.: US 12,763,920 B2
(45) Date of Patent: Oct. 13, 2026

(54) RADIO FREQUENCY MODULE AND COMMUNICATION DEVICE

(71) Applicant: Murata Manufacturing Co., Ltd., Kyoto (JP)

(72) Inventors: Yuusuke Suzuki, Kyoto (JP); Takanori Uejima, Kyoto (JP); Masanari Miura, Kyoto (JP); Jun Takahara, Kyoto (JP); Naoya Matsumoto, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 697 days.

(21) Appl. No.: 18/159,196

(22) Filed: Jan. 25, 2023

(65) Prior Publication Data

US 2023/0171079 A1 Jun. 1, 2023

Related U.S. Application Data

(63) Continuation of application No. PCT/JP2021/024663, filed on Jun. 30, 2021.

(30) Foreign Application Priority Data

Jul. 30, 2020 (JP) ................................ 2020-129503

(51) Int. Cl.
*H04L 5/14* (2006.01)
*H04B 1/40* (2015.01)

(52) U.S. Cl.
CPC ............ *H04L 5/1461* (2013.01); *H04B 1/40* (2013.01)

(58) Field of Classification Search
CPC ....... H04L 5/1461; H04B 1/40; H04B 1/0057; H04B 1/18; H04B 1/44; H04B 1/50; H04B 1/00; H04B 1/006; H04B 1/525
(Continued)

(56) References Cited

U.S. PATENT DOCUMENTS

2015/0373711 A1 12/2015 Narathong et al.
2016/0380652 A1 12/2016 Anthony et al.
(Continued)

FOREIGN PATENT DOCUMENTS

CN 101346890 A 1/2009
CN 110931228 A 3/2020
(Continued)

OTHER PUBLICATIONS

International Search Report for PCT/JP2021/024663 dated Oct. 5, 2021.

*Primary Examiner* — Kwang B Yao
*Assistant Examiner* — Syed M Bokhari
(74) *Attorney, Agent, or Firm* — McDonald Hopkins LLC

(57) ABSTRACT

A radio frequency module, capable of simultaneously transporting a transmission signal in a communication band B for TDD and a reception signal in a communication band A for FDD, includes a filter connected to an antenna connection terminal and having a pass band, the communication band B, a filter connected to the antenna connection terminal and having a pass band, a reception band of the communication band A, a switch to change over between the filter and a transmission input terminal to receive a transmission signal in the communication band B from an outside and the filter and a reception output terminal to supply a reception signal in the communication band B to the outside, and a band elimination filter connected between the transmission input terminal and the switch and having a stop band including the reception band of the communication band A.

10 Claims, 6 Drawing Sheets

(58) Field of Classification Search
USPC .......................................................... 370/278
See application file for complete search history.

(56) References Cited

U.S. PATENT DOCUMENTS

| | | | | |
|---|---|---|---|---|
| 2017/0264336 | A1* | 9/2017 | Saji | H04L 5/14 |
| 2017/0302328 | A1 | 10/2017 | Obiya et al. | |
| 2018/0138927 | A1* | 5/2018 | Nagumo | H04L 5/001 |
| 2018/0302047 | A1* | 10/2018 | Igarashi | H03F 3/217 |
| 2019/0158137 | A1* | 5/2019 | Brunel | H04B 1/04 |
| 2021/0143852 | A1* | 5/2021 | Pehlke | H04B 1/006 |

FOREIGN PATENT DOCUMENTS

| | | | |
|---|---|---|---|
| JP | 2013-247605 | A | 12/2013 |
| JP | 2017-017691 | A | 1/2017 |
| JP | 2017-527155 | A | 9/2017 |
| WO | 2016/117482 | A1 | 7/2016 |
| WO | 2019188968 | A1 | 10/2019 |
| WO | 2020054284 | A1 | 3/2020 |

* cited by examiner

RADIO FREQUENCY MODULE AND COMMUNICATION DEVICE

CROSS REFERENCE TO RELATED APPLICATION

This is a continuation of International Application No. PCT/JP2021/024663 filed on Jun. 30, 2021 which claims priority from Japanese Patent Application No. 2020-129503 filed on Jul. 30, 2020. The contents of these applications are incorporated herein by reference in their entireties.

BACKGROUND ART

Technical Field

The present disclosure relates to a radio frequency module and a communication device.

Recent mobile phones are required to conduct, by a single terminal, simultaneous communication in multiple communication systems and/or multiple communication bands, in addition to conducting multi-mode dealing with multiple communication systems and multi-band dealing with multiple communication bands. For example, Patent Document 1 discloses a diversity module for transmitting an up-link signal (transmission signal) from a diversity antenna.

Patent Document 1: Japanese Unexamined Patent Application Publication (Translation of PCT Application) No. 2017-527155

BRIEF SUMMARY

However, in the related art, when a transmission signal in a wide communication band for time division duplex (TDD) (TDD transmission signal) and a reception signal in a communication band for frequency division duplex (FDD) (FDD reception signal) are simultaneously transported, there is a possibility that an unnecessary wave, within the FDD communication band, included in the TDD transmission signal enters a reception path to transport the FDD reception signal and causes a decrease in the reception sensitivity of the FDD reception signal.

In view of the above, the present disclosure provides a radio frequency module and a communication device that are capable of suppressing the deterioration of the reception sensitivity of an FDD reception signal, when a TDD transmission signal and the FDD reception signal are simultaneously transported.

A radio frequency module according to an aspect of the present disclosure is capable of simultaneously transporting a transmission signal in a first communication band for TDD and a reception signal in a second communication band for FDD. The radio frequency module includes an antenna connection terminal, a first transmission input terminal configured to receive a transmission signal in the first communication band from an outside, a first reception output terminal configured to supply a reception signal in the first communication band to the outside, a second reception output terminal configured to supply a reception signal in the second communication band to the outside, a first filter connected to the antenna connection terminal and having a pass band including the first communication band, a second filter connected to the antenna connection terminal and having a pass band including a reception band of the second communication band, a first switch configured to change over between a connection of the first filter and the first transmission input terminal, and a connection of the first filter and the first reception output terminal, and a first band elimination filter connected between the first transmission input terminal and the first switch, the first band elimination filter having a stop band including the reception band of the second communication band.

According to the present disclosure, when a TDD transmission signal and an FDD reception signal are simultaneously transported, the deterioration of the reception sensitivity of the FDD reception signal may be suppressed.

DETAILED DESCRIPTION

Figure 1:
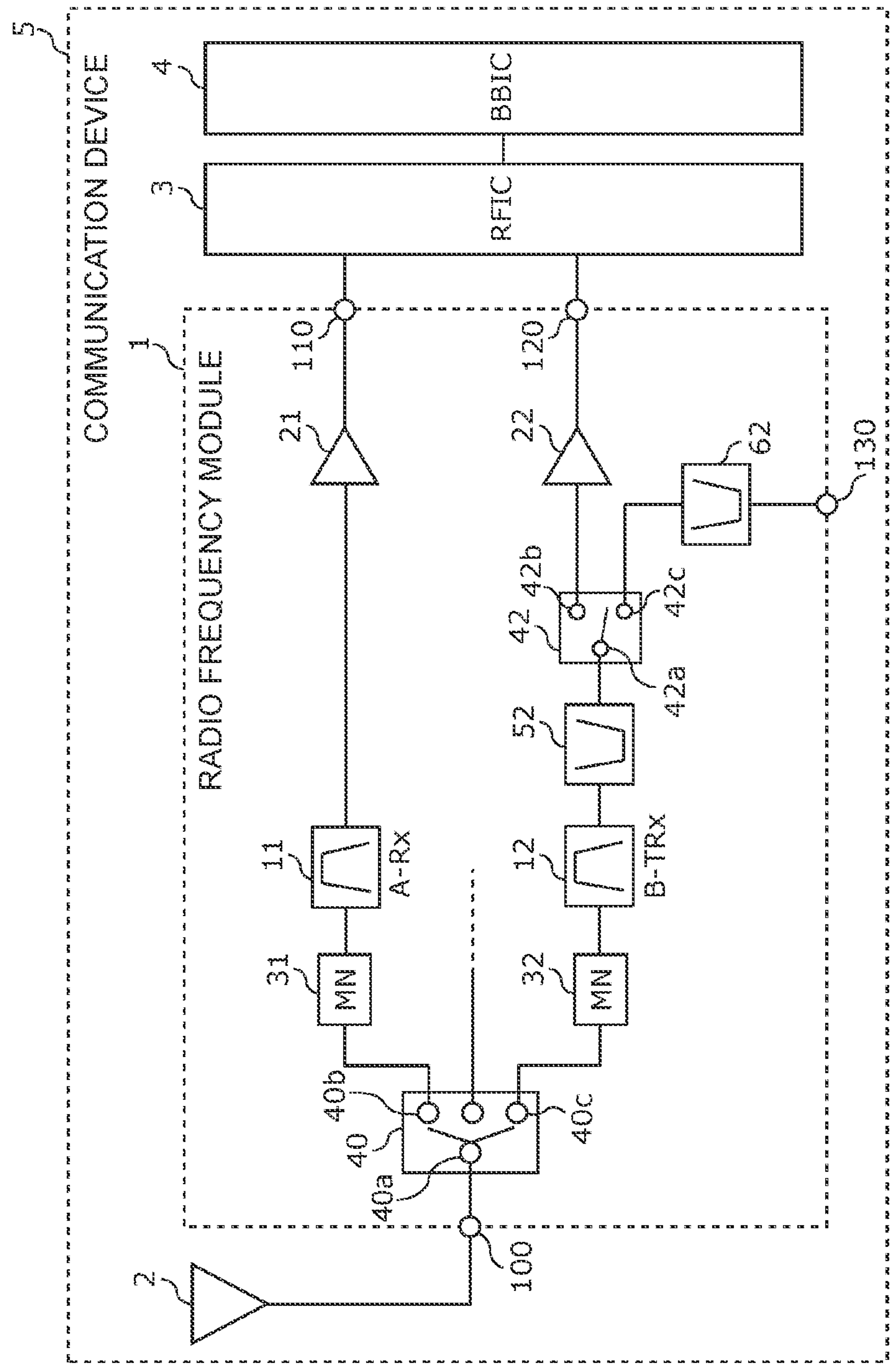
FIG. 1 is a circuit configuration diagram of a radio frequency module and a communication device according to an embodiment.

Hereinafter, embodiments of the present disclosure will be described in detail with reference to the accompanying drawings. Note that embodiments described below provide comprehensive or specific examples. Numerical values, shapes, materials, constituents, arrangement and connection modes of the constituents, and the like described in the embodiments below are merely examples, and are not intended to limit the present disclosure.

Note that each of the drawings is a schematic diagram in which emphasis, omission, or adjustment of a ratio is performed as appropriate to describe the present disclosure, is not necessarily exactly illustrated, and is different from an actual shape, positional relationship, and ratio in some cases. In the drawings, substantially the same configurations are denoted by the same reference signs, and a redundant description thereof is omitted or simplified in some cases.

In each of the following drawings, an x-axis and a y-axis are axes orthogonal to each other on a plane parallel to a main surface of a module substrate. Further, a z-axis is an axis perpendicular to the main surface of the module substrate, and a positive direction thereof indicates an upward direction and a negative direction thereof indicates a downward direction.

In the circuit configuration of the present disclosure, "connected" includes not only a case of being directly connected by a connection terminal and/or a wiring conductor but also a case of being electrically connected with another circuit element interposed therebetween. Further, "connected between A and B" means being connected to both A and B between A and B.

In the module configuration of the present disclosure, a "plan view" means that an object is viewed from a positive side of the z-axis by orthographic projection onto an xy plane. "A component is disposed on a main surface of a substrate" includes not only a case that the component is disposed on the main surface in a state of being in contact with the main surface of the substrate, but also a case that the component is disposed above the main surface without necessarily being in contact with the main surface and a case that part of the component is disposed to be embedded in the substrate from a side of the main surface. "A is disposed between B and C" means that at least one of multiple line segments connecting any point in B and any point in C passes through A. Further, terms indicating a relationship between elements such as "parallel" and "perpendicular", and terms indicating a shape of an element such as "rectangular", do not express only an exact meaning, but also mean a case including a substantially equivalent range, for example, including an error of several percent.

Embodiment

1 Circuit Configuration of Radio Frequency Module 1 and Communication Device 5

A circuit configuration of a radio frequency module 1 and a communication device 5 according to the present embodiment will be described with reference to FIG. 1. FIG. 1 is a circuit configuration diagram of the radio frequency module 1 and the communication device 5 according to Embodiment 1.

[1.1 Circuit Configuration of Communication Device 5]

First, the circuit configuration of the communication device 5 will be described. As illustrated in FIG. 1, the communication device 5 according to the present embodiment includes the radio frequency module 1, an antenna 2, an RF signal processing circuit (RFIC) 3, and a baseband signal processing circuit (BBIC) 4.

The radio frequency module 1 transports a radio frequency signal between the antenna 2 and the RFIC 3. The radio frequency module 1 may be used as a diversity module capable of transmitting a TDD radio frequency signal in addition to receiving a TDD radio frequency signal and a FDD radio frequency signal. A detailed circuit configuration of the radio frequency module 1 will be described later.

The antenna 2 is connected to an antenna connection terminal 100 of the radio frequency module 1, transmits a radio frequency signal outputted from the radio frequency module 1, and receives a radio frequency signal from an outside and outputs the radio frequency signal to the radio frequency module 1.

The RFIC 3 is an example of a signal processing circuit to process a radio frequency signal. Specifically, the RFIC 3 performs signal processing on a radio frequency reception signal inputted via a reception path of the radio frequency module 1 by down-conversion or the like, and outputs a reception signal generated by the signal processing to the BBIC 4. Further, the RFIC 3 performs signal processing on a transmission signal inputted from the BBIC 4 by up-conversion or the like, and outputs a radio frequency transmission signal generated by the signal processing to a transmission path of the radio frequency module 1 via an amplification circuit or the like. Further, the RFIC 3 includes a controller to control a switch, an amplifier, and the like included in the radio frequency module 1. Note that some or all of the functions of the controller of the RFIC 3 may be implemented outside the RFIC 3, such as in the BBIC 4 or the radio frequency module 1, for example.

The BBIC 4 is a baseband signal processing circuit to perform signal processing using an intermediate frequency band of a lower frequency than a frequency of a radio frequency signal transported by the radio frequency module 1. Signals processed in the BBIC 4 are, for example, an image signal for image display and/or an audio signal for a call via a speaker.

Note that, in the communication device 5 according to the present embodiment, the antenna 2 and the BBIC 4 are optional constituents.

[1.2 Circuit Configuration of Radio Frequency Module 1]

Next, the circuit configuration of the radio frequency module 1 will be described. As illustrated in FIG. 1, the radio frequency module 1 includes the antenna connection terminal 100, reception output terminals 110 and 120, a transmission input terminal 130, filters 11 and 12, band elimination filters 52 and 62, switches 40 and 42, matching circuits (MN) 31 and 32, and low-noise amplifiers 21 and 22.

The antenna connection terminal 100 is connected to the antenna 2.

The transmission input terminal 130 is a terminal to receive an amplified radio frequency transmission signal from an outside of the radio frequency module 1.

Specifically, the transmission input terminal 130 is a terminal to receive a transmission signal in a communication band B for TDD being amplified by an external power amplification circuit.

The reception output terminals 110 and 120 are each a terminal for providing a radio frequency reception signal to an outside of the radio frequency module 1.

Specifically, the reception output terminal 110 is an example of a second reception output terminal, and is a terminal to supply a reception signal in a communication band A to the RFIC 3. The reception output terminal 120 is an example of a first reception output terminal, and is a terminal to supply a reception signal in the communication band B to the RFIC 3.

Here, a communication band means a frequency band defined in advance by, for example, a standardization organization for a communication system (such as 3rd Generation Partnership Project (3GPP), Institute of Electrical and Electronics Engineers (IEEE), and the like). The communication system refers to a communication system constructed by using radio access technology (RAT). As the communication system, a 5th Generation New Radio (5GNR) system, a Long Term Evolution (LTE) system, a Wireless Local Area Network (WLAN) system, or the like may be used, for example, but the communication system is not limited thereto.

The communication band A is an example of a second communication band. Simultaneous communication can be performed on the communication band A and the communication band B. As the communication band A, Band B3 (1710 to 1785 MHz, 1805 to 1880 MHz) for LTE may be used, but the communication band A is not limited thereto. For example, the communication band A may be any of Bands B1 (1920 to 1980 MHz, 2110 to 2170 MHz), B7 (2500 to 2570 MHz, 2620 to 2690 MHz), B25 (1850 to 1915 MHz, 1930 to 1995 MHz), B34 (2010 to 2025 MHz), B39 (1880 to 1920 MHz), B66 (1710 to 1780 MHz, 2110 to 2200 MHz) for LTE, and Bands n75 (1432 to 1517 MHz) and n76 (1427 to 1432 MHz) for 5GNR. Further, for example, a frequency band for WLAN may be used as the communication band A. Further, for example, a millimeter wave band of 7 gigahertz or more may be used as the communication band A.

The communication band B is an example of a first communication band, and is a communication band for TDD. As a communication band D, Band B41 (2496 to 2690 MHz) for LTE may be used, but the communication band D is not limited thereto. A frequency band for 5GNR or WLAN may be used as the communication band B, for example. Further, for example, a millimeter wave band of 7 gigahertz or more may be used as the communication band B.

Note that, the expression of being capable of simultaneous communication in multiple communication bands means that at least one of simultaneous transmission, simultaneous reception, and simultaneous transmission and reception in the multiple communication bands is allowed. Here, it is not excluded that each of the multiple communication bands is used solely. A combination of communication bands being capable of simultaneous communication is defined in advance by, for example, a standardization organization for a communication system.

Further, the expression of being incapable of simultaneous communication in multiple communication bands means that any of simultaneous transmission, simultaneous reception, and simultaneous transmission and reception in the multiple communication bands is not allowed. A combination of communication bands being incapable of simultaneous communication is a combination of communication bands excluding the combination of communication bands being capable of simultaneous communication.

The filter 11 (A-Rx) is an example of a second filter, and has a pass band including a reception band (down-link operation band) of the communication band A. Thus, the filter 11 can let a reception signal in the communication band A pass through. An input terminal of the filter 11 is connected to the antenna connection terminal 100 via the matching circuit 31 and the switch 40, and an output terminal of the filter 11 is connected to an input terminal of the low-noise amplifier 21.

The filter 12 (B-TRx) is an example of a first filter, and has a pass band including the communication band B. Thus, the filter 12 can let a transmission signal and a reception signal in the communication band D pass through. One terminal of the filter 12 is connected to the antenna connection terminal 100 via the matching circuit 32 and the switch 40, and another terminal is connected to one terminal of the band elimination filter 52.

The band elimination filter 62 is an example of a first band elimination filter, is connected between the transmission input terminal 130 and the switch 42, and has a stop band including the reception band of the communication band A. Thus, the band elimination filter 62 can attenuate a signal component in the reception band of the communication band A in a transmission signal inputted from the transmission input terminal 130, and can let a signal component in a band other than the reception band of the communication band A pass through.

The band elimination filter 52 is an example of a second band elimination filter, is connected between the filter 12 and the switch 42, and has a stop band of a predetermined frequency band whose frequency does not overlap with the communication band B. Thus, the band elimination filter 52 can attenuate a signal component in the predetermined frequency band in a reception signal inputted from the antenna connection terminal 100, and can let a signal component in a band other than the predetermined frequency band pass through toward the switch 42 and the low-noise amplifier 22. Further, the band elimination filter 52 can attenuate a signal component in the predetermined frequency band in a transmission signal inputted from the transmission input terminal 130, and can let a signal component in a band other than the predetermined frequency band pass through toward the filter 12.

The low-noise amplifier 21 is an example of a second low-noise amplifier, and is connected between the filter 11 and the reception output terminal 110. The low-noise amplifier 21 can amplify a reception signal in the communication band A inputted from the antenna connection terminal 100 via the switch 40, the matching circuit 31, and the filter 11. The reception signal in the communication band A amplified by the low-noise amplifier 21 is outputted to the reception output terminal 110.

The low-noise amplifier 22 is an example of a first low-noise amplifier, and is connected between the switch 42 and the reception output terminal 120. The low-noise amplifier 22 can amplify the reception signal in the communication band B inputted from the antenna connection terminal 100 via the switch 40, the matching circuit 32, the filter 12, the band elimination filter 52, and the switch 42. The reception signal in the communication band B amplified by the low-noise amplifier 22 is outputted to the reception output terminal 120.

The switch 40 is an example of a second switch, and is connected between the antenna connection terminal 100 and the filters 11 and 12. Specifically, the switch 40 has a common terminal 40*a* and selection terminals 40*b* and 40*c*. The common terminal 40*a* is connected to the antenna connection terminal 100. The selection terminal 40*b* is connected to the filter 11 via the matching circuit 31. The selection terminal 40*c* is connected to the filter 12 via the matching circuit 32.

In the connection configuration above, the switch 40 can connect the common terminal 40*a* to at least one of the selection terminals 40*b* and 40*c* based on a control signal from, for example, the RFIC 3. That is, the switch 40 changes over between a connection and a disconnection of the antenna connection terminal 100 and the filter 11, and changes over between a connection and a disconnection of the antenna connection terminal 100 and the filter 12. The switch 40 is configured by a multi-connection switch circuit, for example, and is referred to as an antenna switch in some cases.

The switch 42 is connected between the band elimination filter 52, and the transmission input terminal 130 and the low-noise amplifier 22. Specifically, the switch 42 has a common terminal 42*a* and selection terminals 42*b* and 42*c*. The common terminal 42*a* is connected to one terminal of the band elimination filter 52. The selection terminal 42*b* is connected to an input terminal of the low-noise amplifier 22, and the selection terminal 42*c* is connected to the transmission input terminal 130.

In the connection configuration above, the switch 42 can connect the common terminal 42*a* to either of the selection terminal 42*b* or the selection terminal 42*c* based on a control signal from, for example, the RFIC 3. That is, the switch 42 can change over between a connection of the filter 12 and the reception output terminal 120, and a connection of the filter 12 and the transmission input terminal 130. The switch 42 is configured of a single pole double throw (SPDT) switch circuit, for example, and is referred to as a TDD switch in some cases.

The matching circuit 31 is configured of an inductor and/or a capacitor, for example, and is capable of achieving impedance matching between the antenna 2 and the filter 11. The matching circuit 31 is connected between the switch 40 and the filter 11.

The matching circuit 32 is configured of an inductor and/or a capacitor, for example, and is capable of achieving impedance matching between the antenna 2 and the filter 12. The matching circuit 32 is connected between the switch 40 and the filter 12.

Note that some of the circuit elements illustrated in FIG. 1 are not necessarily required to be included in the radio frequency module 1. For example, it is sufficient that the radio frequency module 1 includes at least the antenna connection terminal 100, the reception output terminals 110 and 120, the transmission input terminal 130, the filters 11 and 12, the band elimination filter 62, and the switches; and the radio frequency module 1 does not necessarily include other circuit elements.

Further, the radio frequency module 1 may include a signal path to transport a radio frequency signal in a communication band different from the communication bands A and B. Note that a filter, of which pass band is a communication band different from at least the communication bands A and B, is disposed in a signal path to transport a radio frequency signal of a communication band different from the communication bands A and B.

2 Signal Transport Flow in Communication Device 5

Figure 2:
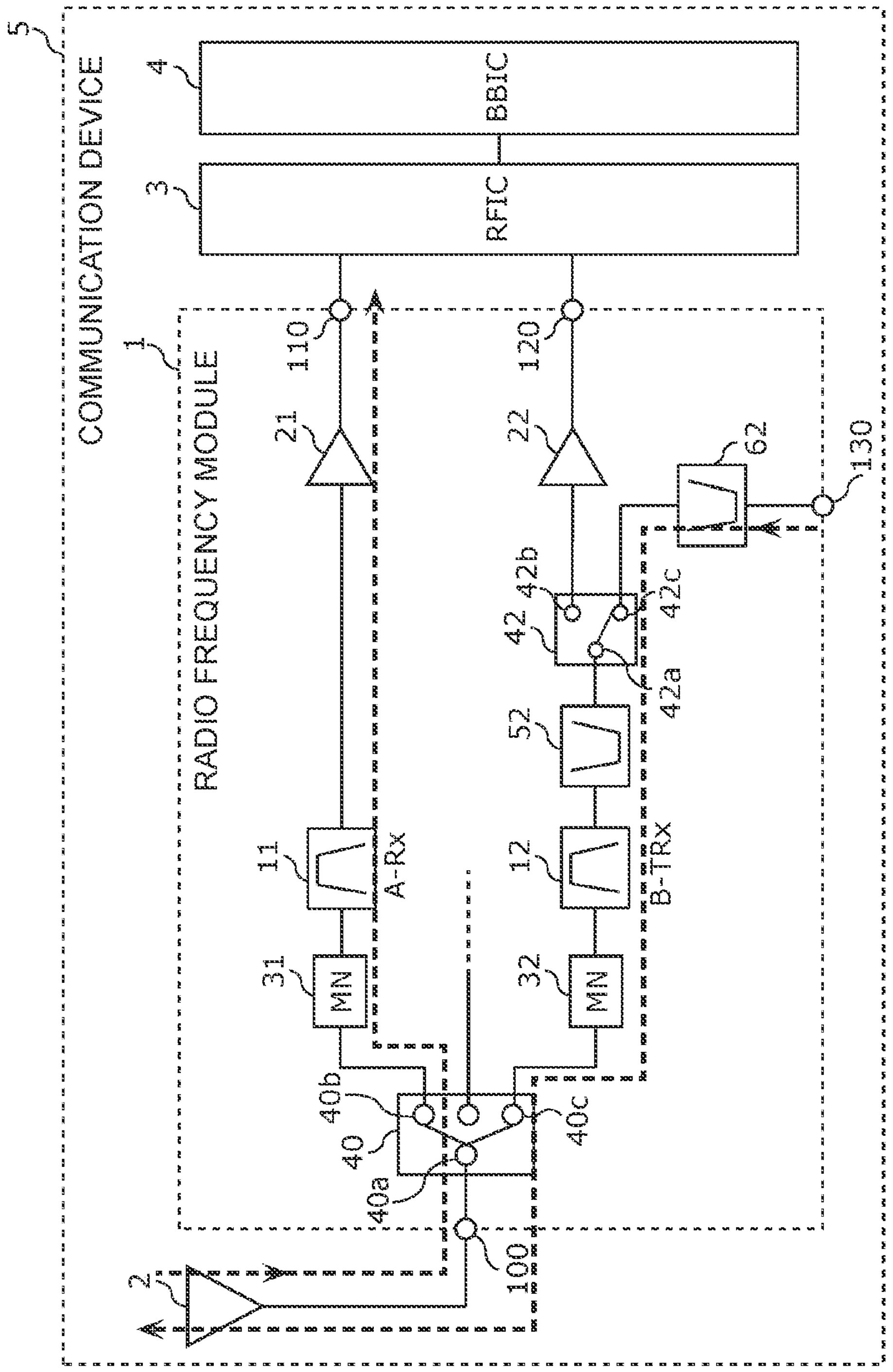
FIG. 2 is a diagram illustrating a signal flow when TDD transmission and FDD reception are simultaneously performed in the radio frequency module and the communication device according to the embodiment.

Next, a signal transport flow in the radio frequency module 1 and the communication device 5 configured as described above will be described with reference to FIG. 2. FIG. 2 is a diagram illustrating a signal flow when TDD transmission and FDD reception are simultaneously performed in the radio frequency module 1 and the communication device 5 according to the embodiment.

As illustrated in FIG. 2, in the radio frequency module 1 and the communication device 5 according to the present embodiment, a transmission signal in the communication band B and a reception signal in the communication band A are simultaneously transported. Specifically, the transmission signal in the communication band B is outputted from the antenna 2 via the transmission input terminal 130, the band elimination filter 62, the switch 42, the band elimination filter 52, the filter 12, the matching circuit 32, the switch 40, and the antenna connection terminal 100. Further, the reception signal in the communication band A is outputted from the reception output terminal 110 via the antenna 2, the antenna connection terminal 100, the switch 40, the matching circuit 31, the filter 11, and the low-noise amplifier 21.

At this time, the transmission signal inputted from the transmission input terminal 130 includes a noise component in a band other than the communication band B. When a signal component in the reception band of the communication band A is included as the noise component, for example, it is assumed that the noise component flows into a reception path of the communication band A via the switch 40. In the case above, there is a possibility that the noise component is superimposed on the reception signal in the communication band A transported from the antenna 2 through the reception path of the communication band A, and the reception sensitivity of the reception signal in the communication band A is deteriorated. Note that, since the filter 12 needs to ensure a pass band being a wide band for TDD, an attenuation amount for sufficiently attenuating the noise component in an attenuation band cannot be ensured. Thus, it is assumed that the noise component passes through the filter 12 and flows into the reception path of the communication band A from the switch 40.

Meanwhile, in the radio frequency module 1 according to the present embodiment, the band elimination filter 62, having a stop band of the reception band of the communication band A, is disposed between the transmission input terminal 130 and the switch 42. This makes it possible to attenuate the noise component in the reception band of the communication band A flowing in from the transmission input terminal 130.

Thus, when a TDD transmission in the communication band B and an FDD reception in the communication band A are performed at the same time, the deterioration of the reception sensitivity of a reception signal in the communication band A may be suppressed.

Note that the band elimination filter 62 is disposed in a transmission path of the communication band B between the transmission input terminal 130 and the switch 42, and is not disposed on a reception path of the communication band B. With this, an increase of transport loss, due to the band elimination filter 62, of a reception signal in the communication band B may be avoided.

Further, since the band elimination filter 52, having a stop band of a predetermined frequency band, is disposed between the filter 12 and the switch 42, it is possible to eliminate a noise component in the predetermined frequency band from a transmission signal inputted from the transmission input terminal 130. Thus, it is possible to suppress the deterioration of the signal quality of a transmission signal in the communication band B outputted from the antenna connection terminal 100. Further, it is possible to eliminate a noise component in the predetermined frequency band from a reception signal in the communication band B inputted from the antenna connection terminal 100. Thus, it is possible to suppress the deterioration of the reception sensitivity of a reception signal in the communication band B, the reception signal being inputted from the antenna connection terminal 100, passing through the filter 12 and the switch 42, and being outputted from the reception output terminal 120. Note that, since the filter 12 needs to ensure a pass band being a wide band for TDD, an attenuation amount for sufficiently attenuating a noise component in a predetermined frequency band cannot be ensured. Thus, it is assumed that part of the noise component passes through the filter 12.

Note that the predetermined frequency band may be a band including at least one of Band n77 (3300 to 4200 MHz) and n79 (4400 to 5000 MHz) for 5th Generation New Radio (5GNR), for example. When the communication band A is Band B3 for LTE and the communication band B is Band B41 for LTE, the stop band of the band elimination filter 52 is positioned on a higher frequency side of a pass band of the filter 12, and the stop band of the band elimination filter 62 is positioned on a lower frequency side of the pass band of the filter 12.

3 Circuit Configuration of Radio Frequency Module 6 and Communication Device 7 According to Modification 1

Figure 3:
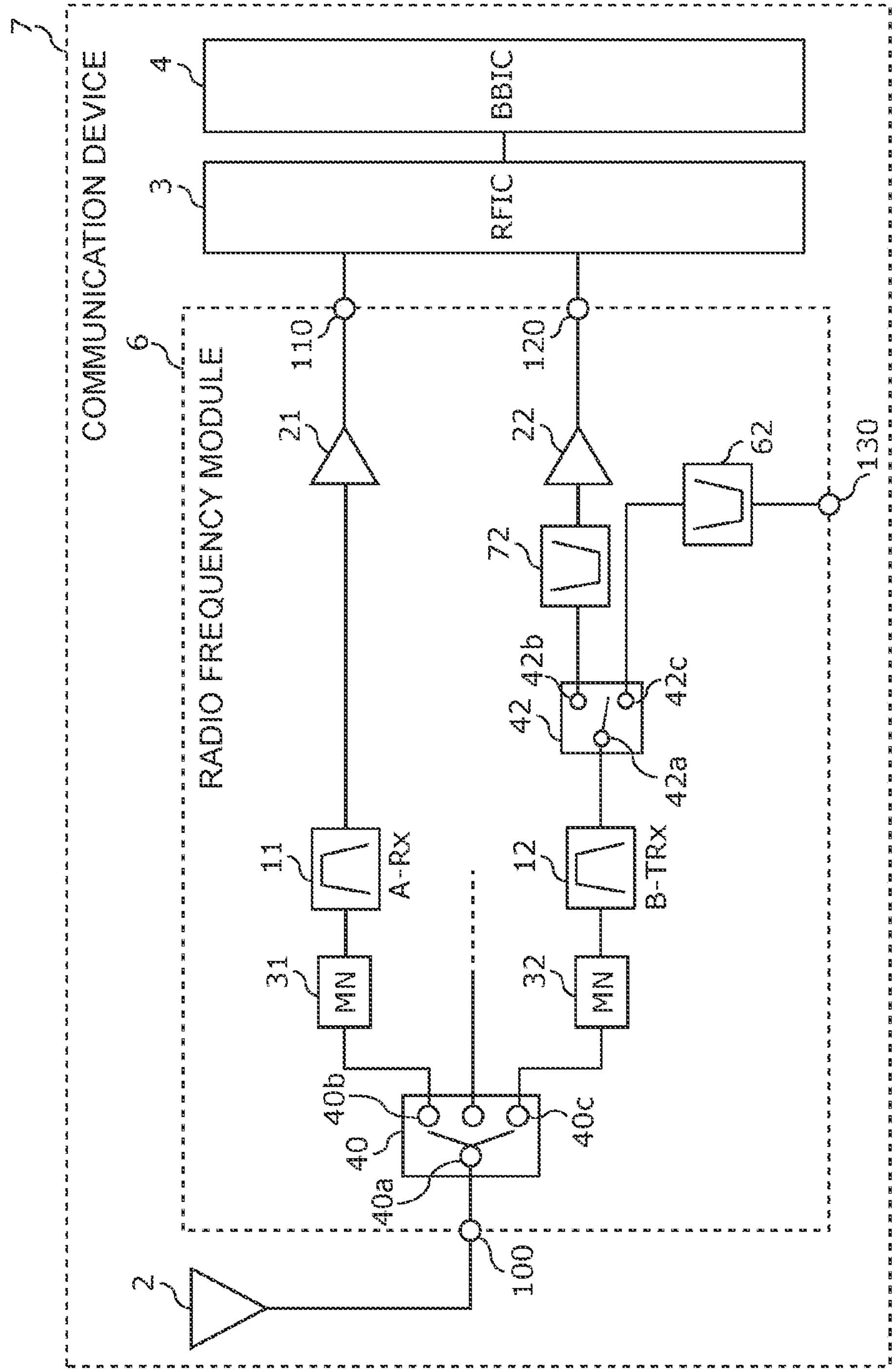
FIG. 3 is a circuit configuration diagram of a radio frequency module and a communication device according to Modification 1 of the embodiment.

Next, circuit configurations of a radio frequency module 6 and a communication device 7 according to Modification 1 will be described. FIG. 3 is a circuit configuration diagram of the radio frequency module 6 and the communication device 7 according to Modification 1 of the embodiment.

[3.1 Circuit Configuration of Communication Device 7]

First, the circuit configuration of the communication device 7 will be described. As illustrated in FIG. 3, the communication device 7 according to the present modification includes the radio frequency module 6, the antenna 2, the RFIC 3, and the BBIC 4. The communication device 7 according to the present modification is different from the communication device 5 according to the embodiment only in the configuration of the radio frequency module 6. Hereinafter, therefore, only the radio frequency module 6 of the communication device 7 will be described.

[3.2 Circuit Configuration of Radio Frequency Module 6]

As illustrated in FIG. 3, the radio frequency module 6 includes the antenna connection terminal 100, the reception output terminals 110 and 120, the transmission input terminal 130, the filters 11 and 12, band elimination filters 62 and 72, the switches 40 and 42, the matching circuits (MN) 31 and 32, and the low-noise amplifiers 21 and 22. The radio frequency module 6 according to the present modification is different from the radio frequency module 1 according to the embodiment in that the band elimination filter 72 is disposed instead of the band elimination filter 52. Hereinafter, with respect to the radio frequency module 6 according to the present modification, a description of the same points as those of the radio frequency module 1 according to the embodiment will be omitted, and different points will mainly be described.

The band elimination filter 72 is an example of a second band elimination filter, is connected between the switch 42 and the reception output terminal 120, and has a stop band of a predetermined frequency band whose frequency does not overlap with the communication band B. Thus, the band elimination filter 72 can attenuate a signal component in the predetermined frequency band in the reception signal inputted from the antenna connection terminal 100, and can let a signal component in a band other than the predetermined frequency band pass through toward the low-noise amplifier 22.

With this, it is possible to eliminate a noise component in the predetermined frequency band from a reception signal in the communication band B inputted from the antenna connection terminal 100. Thus, it is possible to suppress the deterioration of the reception sensitivity of a reception signal in the communication band B, the reception signal being inputted from the antenna connection terminal 100, passing through the filter 12 and the switch 42, and being outputted from the reception output terminal 120.

Note that the band elimination filter 72 is disposed in the reception path of the communication band B between the switch 42 and the reception output terminal 120, and is not disposed in the transmission path of the communication band B. With this, an increase in transport loss, due to the band elimination filter 72, of a transmission signal in the communication band B may be avoided.

4 Circuit Configuration of Radio Frequency Module 8 According to Modification 2

Figure 4:
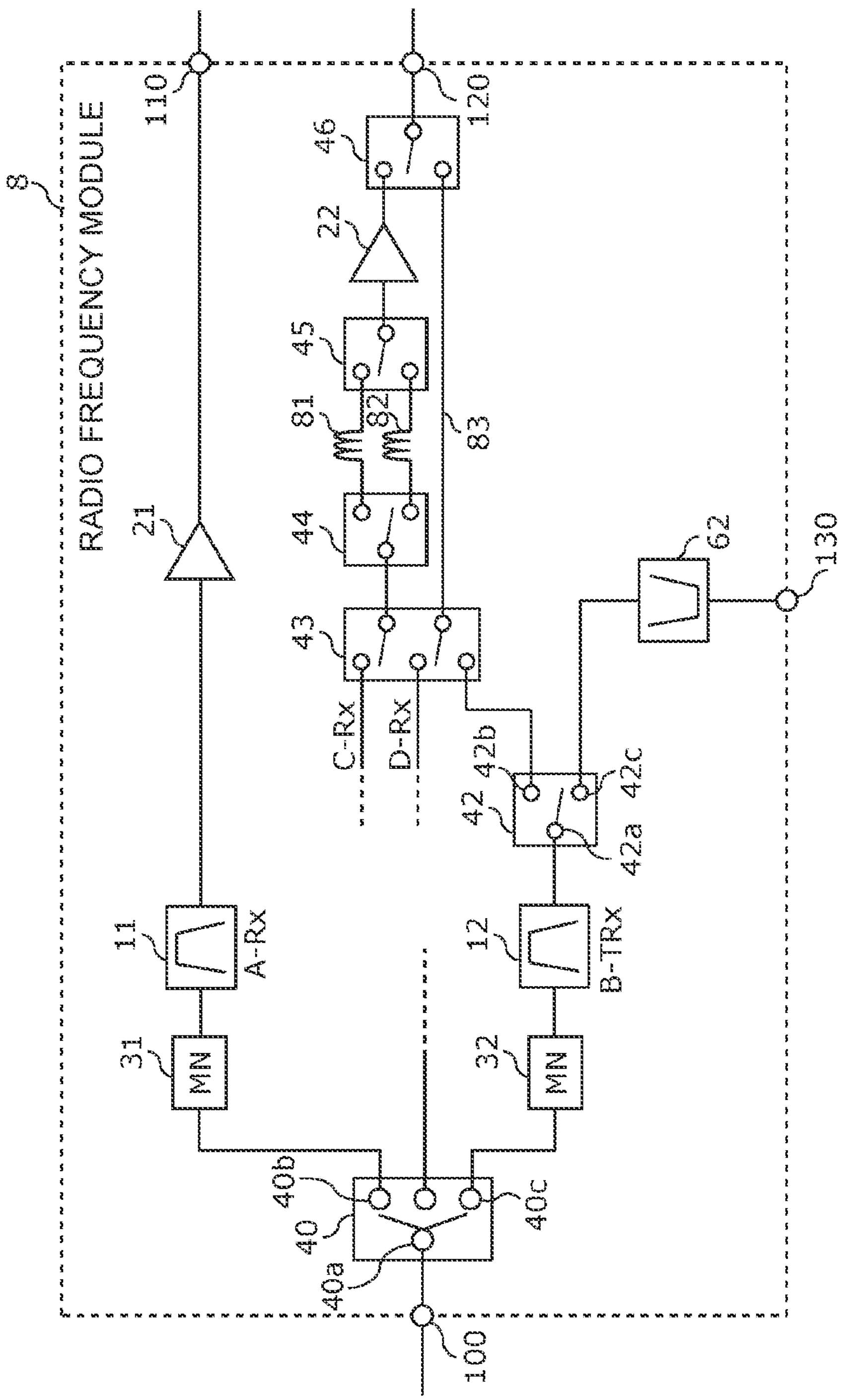
FIG. 4 is a circuit configuration diagram of a radio frequency module according to Modification 2 of the embodiment.

Next, a circuit configuration of a radio frequency module 8 according to Modification 2 will be described. FIG. 4 is a circuit configuration diagram of the radio frequency module 8 according to Modification 2 of the embodiment. As illustrated in FIG. 4, the radio frequency module 8 includes the antenna connection terminal 100, the reception output terminals 110 and 120, the transmission input terminal 130, the filters 11 and 12, the band elimination filter 62, switches 40, 42, 43, 44, 45, and 46, the matching circuits 31 and 32, inductors 81 and 82, a bypass path 83, and the low-noise amplifiers 21 and 22. The radio frequency module 8 according to the present modification is different from the radio frequency module 1 according to the embodiment in that the inductors 81 and 82, the bypass path 83, and the switches 43 to 45 are added and that the band elimination filter 52 is not disposed. Hereinafter, with respect to the radio frequency module 8 according to the present modification, a description of the same points as those of the radio frequency module 1 according to the embodiment will be omitted, and different points will mainly be described.

The inductor 81 is an example of a first impedance matching element, and is connected between the switches 44 and 45. The inductor 82 is an example of a second impedance matching element having an inductance value different from that of the inductor 81, and is connected between the switches 44 and 45.

Note that each of the inductors 81 and 82 may be configured of one or more impedance matching elements, or may be at least one of a capacitor and an inductor.

The switch 43 has first to fifth terminals. The first terminal is connected to the selection terminal 42*b*, the second terminal is connected to a reception path of a communication band C (third communication band), the third terminal is connected to a reception path of a communication band D, the fourth terminal is connected to the bypass path 83, and the fifth terminal is connected to the common terminal of the switch 44. In the above connection configuration, the switch 43 changes over a connection between any of the first to third terminals, and any of the fourth terminal and the fifth terminal. The switch 46 has a common terminal, a first selection terminal, and a second selection terminal. The common terminal is connected to the reception output terminal 120, the first selection terminal is connected to the output terminal of the low-noise amplifier 22, and the second selection terminal is connected to the bypass path 83. In the above connection configuration, the switch 46 changes over a connection between the common terminal, and any of the first selection terminal and the second selection terminal.

The switch 44 includes a common terminal, a first selection terminal, and a second selection terminal. The first selection terminal is connected to one end of the inductor 81, and the second selection terminal is connected to one end of the inductor 82. In the above connection configuration, the switch 44 changes over a connection between the common terminal, and any of the first selection terminal and the second selection terminal. The switch 45 has a common terminal, a first selection terminal, and a second selection terminal. The common terminal is connected to the input terminal of the low-noise amplifier 22, the first selection terminal is connected to the other end of the inductor 81, and the second selection terminal is connected to the other end of the inductor 82. In the above connection configuration, the switch 45 changes over a connection between the common terminal, and any of the first selection terminal and the second selection terminal.

The switches 43 to 46 constitute a switch circuit, and change over a connection between: any of a reception path to transport a reception signal in the communication band B, a reception path to transport a reception signal in the communication band C, and a reception path to transport a reception signal in the communication band D; and any of the inductors 81 and 82, and the bypass path 83.

The low-noise amplifier 22 is an example of the first low-noise amplifier, and is connected between the switches 43 and 45, and the reception output terminal 120. The low-noise amplifier 22 can amplify the reception signal in the communication band B inputted from the antenna connection terminal 100 via the switch 40, the matching circuit 32, the filter 12, and the switch 42, can amplify the reception signal in the communication band C, and can amplify the reception signal in the communication band D. The reception signals in the communication bands B, C, and D amplified by the low-noise amplifier 22 are each outputted to the reception output terminal 120.

In the connection configuration above, the switches 43 to 46 can connect the filter 12, the switch 42 (reception path through which a reception signal in the communication band B is transported), the inductor 81, the low-noise amplifier 22, and the reception output terminal 120 based on a control signal from, for example, the RFIC 3. Further, the switches 43 to 46 can connect the reception path to transport a reception signal in the communication band C, the inductor 82, the low-noise amplifier 22, and the reception output terminal 120. Further, the switches 43 to 46 can connect the reception path to transport a reception signal in the communication band D, the inductor 82, the low-noise amplifier 22, and the reception output terminal 120. Still further, the switches 43 to 46 can connect any of the reception path to transport a reception signal in the communication band B, the reception path to transport a reception signal in the communication band C, and the reception path to transport a reception signal in the communication band D, to the bypass path 83 and the reception output terminal 120. That is, the switches 43 to 46 can change over between: a connection of the switch 42, the inductor 81, and the input terminal of the low-noise amplifier 22; and a connection of the reception path to transport a reception signal in the communication band C or D, the inductor 82, and the input terminal of the low-noise amplifier 22.

With this, it is possible to optimize the impedance matching element for matching the input impedance of the low-noise amplifier 22 in accordance with the frequency band of a reception signal transported through the radio frequency module 8. In particular, since the impedance matching element can be customized in accordance with a reception signal in the communication band B, it is possible to decrease a noise figure in the communication band B being a wide band for TDD. Further, since the bypass path 83 bypassing the low-noise amplifier 22 can be selected, a reception signal of a small-signal can be outputted, with low noise, from the reception output terminal 120.

Note that each of the inductors 81 and 82 may be configured of one or more impedance matching elements, and it is sufficient to be at least one of a capacitor and an inductor.

In the radio frequency module 8 according to the present modification, the band elimination filter 52 may be disposed between the filter 12 and the switch 42, and the band elimination filter 72 may be disposed between the switch 42 and the switch 43.

5 Circuit Configuration Example of Band Elimination Filter

Next, a circuit configuration of the band elimination filter disposed in the radio frequency module 1, 6, or 8 will be described.

Figure 5A:
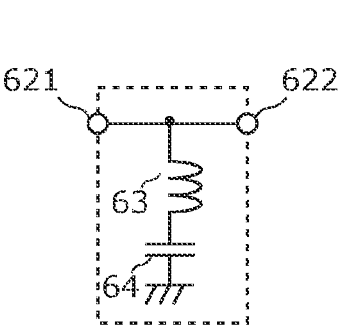
FIG. 5A is a circuit configuration diagram of a first band elimination filter according to the embodiment.

FIG. 5A is a circuit configuration diagram of the band elimination filter 62 according to the embodiment. As illustrated in FIG. 5A, the band elimination filter 62 includes input/output terminals 621 and 622, an inductor 63, and a capacitor 64. The inductor 63 and the capacitor 64 are connected in series between a path, connecting the input/output terminals 621 and 622, and a ground. The inductor 63 and the capacitor 64 constitute a so-called LC series resonant circuit. With the configuration above, the resonant frequency of the LC series resonant circuit corresponds to an attenuation pole of the stop band of the band elimination filter 62. In the present embodiment, the stop band of the band elimination filter 62 is positioned on a lower frequency side of the pass band of the filter 12.

Note that the LC series resonant circuit configured of the inductor 63 and the capacitor 64 may be an acoustic wave resonator connected between the path, connecting the input/output terminals 621 and 622, and the ground. In the case above, an attenuation slope of the stop band of the band elimination filter 62 can be made steeper.

Figure 5B:
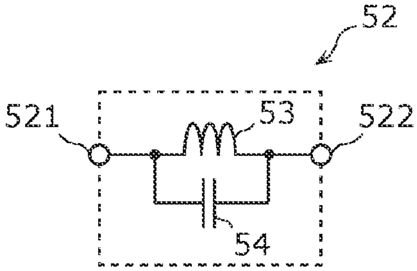
FIG. 5B is a circuit configuration diagram of a second band elimination filter according to the embodiment.

FIG. 5B is a circuit configuration diagram of the band elimination filter 52 according to the embodiment. As illustrated in FIG. 5B, in the band elimination filter 52, an LC parallel resonant circuit of an inductor 53 and a capacitor 54 is disposed in series between an input/output terminal 521 and an input/output terminal 522. With the configuration above, the anti-resonant frequency of the LC parallel resonant circuit corresponds to an attenuation pole of the stop band of the band elimination filter 52. Note that, in the present embodiment, the stop band of the band elimination filter 52 is positioned on the higher frequency side of the pass band of the filter 12.

Note that the LC parallel resonant circuit configured of the inductor 53 and the capacitor 54 may be an acoustic wave resonator disposed in series on a path connecting the input/output terminal 521 and the input/output terminal 522. In the case above, an attenuation slope of the stop band of the band elimination filter 52 can be made steeper.

Note that the above-described circuit configurations of the band elimination filters 62 and 52 are each merely an example, and the circuit configurations are not limited to the above-described circuit configurations.

6 Component Arrangement of Radio Frequency Module

Next, a component arrangement of the radio frequency module 1 configured as described above will specifically be described with reference to FIG. 6.

Figure 6:
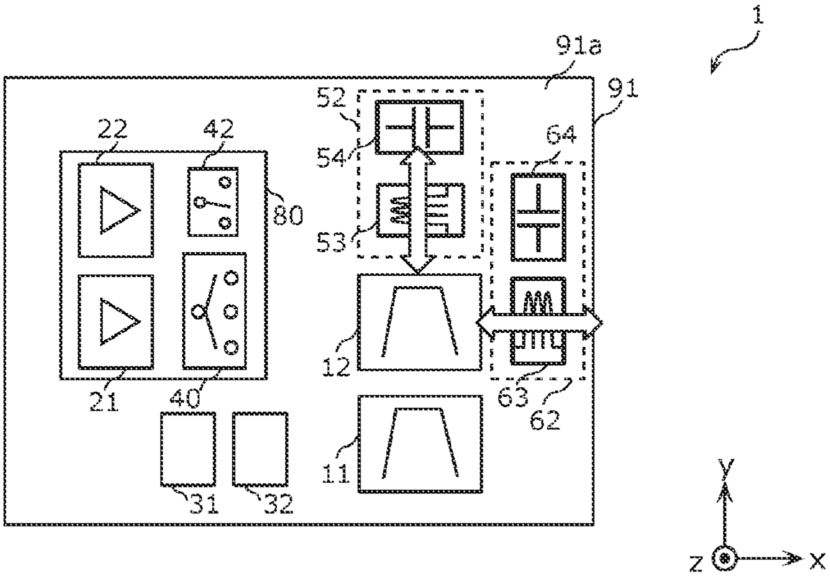
FIG. 6 is a plan view of the radio frequency module according to the embodiment.

FIG. 6 is a plan view of the radio frequency module 1 according to the embodiment. Specifically, FIG. 6 is a view of a main surface 91*a* of a module substrate 91 viewed from the positive side of the z-axis. As illustrated in FIG. 6, the radio frequency module 1 further includes the module substrate 91 in addition to the circuit components constituting the circuit illustrated in FIG. 1.

The module substrate 91 has the main surface 91*a* to which the z-axis is normal. As the module substrate 91, a low temperature co-fired ceramics (LTCC) substrate having a laminated structure of multiple dielectric layers, a high temperature co-fired ceramics (HTCC) substrate, a component built-in substrate, a substrate having a redistribution layer (RDL), a printed substrate, or the like may be used, for example, but the module substrate 91 is not limited thereto.

As illustrated in FIG. 6, the filters 11 and 12, the band elimination filters 52 and 62, the switches 40 and 42, the matching circuits 31 and 32, and the low-noise amplifiers 21 and 22 are arranged on the main surface 91*a*.

Note that a resin member may be disposed to cover the main surface 91*a* and the circuit components disposed on the main surface 91*a*. Further, a metal shield layer may be formed in contact with the outer surface of the resin member and the side surface of the module substrate 91.

The band elimination filter 52 includes at least the inductor 53 (second inductor) and the capacitor 54 disposed on the main surface 91*a*. The band elimination filter 62 includes at least the inductor 63 (first inductor) and the capacitor 64 disposed on the main surface 91*a*.

Here, a winding axis of a coil constituting the inductor 63 and a winding axis of a coil constituting the inductor 53 are orthogonal to each other. As illustrated in FIG. 6, the winding axis of the coil of the inductor 63 is parallel to the x-axis, and the winding axis of the coil of the inductor 53 is parallel to the y-axis. Note that each of the inductors 63 and 53 may be a chip inductor disposed on the main surface of the module substrate 91 or may be formed by a conductor pattern incorporated in the module substrate 91.

With this, the magnetic field coupling between the inductor 63 and the inductor 53 may be suppressed. Thus, it is possible to suppress a noise component in the reception band of the communication band A, flowing in from the transmission input terminal 130, to flow into the reception path to transport a reception signal in the communication band A, without necessarily passing through the band elimination filter 62 due to the magnetic field coupling of the inductor 63 and the inductor 53.

Note that the winding axis of the coil of the inductor 63 and the winding axis of the coil of the inductor 53 are not necessarily orthogonal to each other, but only need to be provided at positions not parallel to each other. Thus, in comparison with a case that the winding axis of the coil of the inductor 63 and the winding axis of the coil of the inductor 53 are parallel to each other, it is possible to suppress a noise component in the reception band of the communication band A, flowing in from the transmission input terminal 130, to flow into the reception path to transport a reception signal in the communication band A, without necessarily passing through the band elimination filter 62 due to the magnetic field coupling of the inductor 63 and the inductor 53.

Note that, in the radio frequency module 6 according to Modification 1, the winding axis of the coil constituting the inductor 63 and the winding axis of the coil constituting an inductor included in the band elimination filter 72 may be provided at positions not parallel to each other. With this, it is possible to suppress a noise component in the reception band of the communication band A, flowing in from the transmission input terminal 130, to flow into the reception path to transport a reception signal in the communication band B, without necessarily passing through the band elimination filters 62 and 72 due to the magnetic field coupling of the inductor 63 and the inductor included in the band elimination filter 72.

Note that, as illustrated in FIG. 6, the low-noise amplifiers 21 and 22, and the switches 40 and 42 may be incorporated in a semiconductor integrated circuit (IC) 80. The semiconductor IC 80 is an electronic circuit formed on and within a semiconductor chip (also called a die), and is also called a semiconductor component. The semiconductor IC 80 is configured of a complementary metal oxide semiconductor (CMOS), for example, and specifically, may be configured with a silicon on insulator (SOI) process. This makes it possible to manufacture the semiconductor IC 80 at low cost. Note that the semiconductor IC 80 may be configured of at least one of GaAs, SiGe, and GaN. This makes it possible to realize a high-quality semiconductor IC 80.

7 Component Arrangement of Radio Frequency Module 1A

Next, a component arrangement of a radio frequency module 1A according to Modification 3 will specifically be described with reference to FIG. 7.

Figure 7:
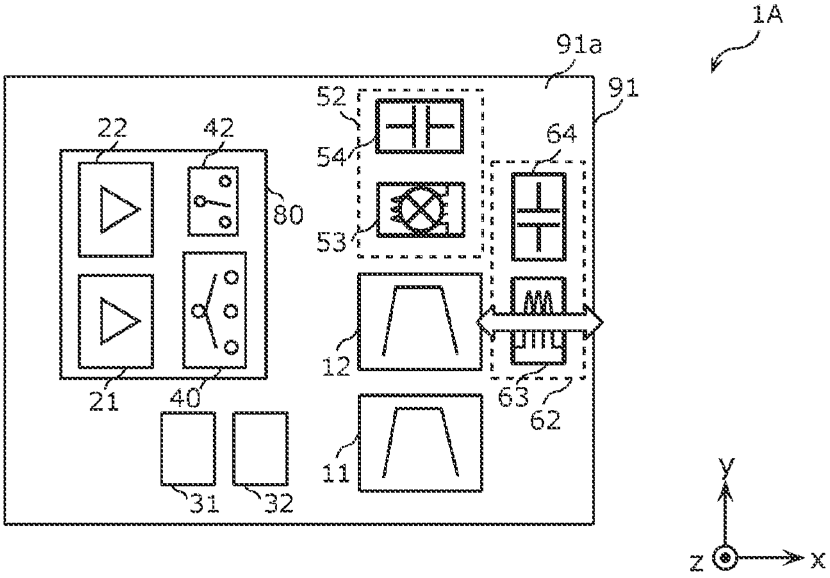
FIG. 7 is a plan view of a radio frequency module according to Modification 3 of the embodiment.

FIG. 7 is a plan view of the radio frequency module 1A according to Modification 3 of the embodiment. As illustrated in FIG. 7, the radio frequency module 1A further includes the module substrate 91 in addition to the circuit components constituting the circuit illustrated in FIG. 1. The radio frequency module 1A according to the present modification is different from the radio frequency module 1 according to the embodiment only in the arrangement configuration of the inductor 53. Hereinafter, with respect to the radio frequency module 1A according to the present modification, a description of the same points as those of the radio frequency module 1 according to the embodiment will be omitted, and different points will mainly be described.

The winding axis of the coil constituting the inductor 63 and the winding axis of the coil constituting the inductor 53 are orthogonal to each other. As illustrated in FIG. 7, the winding axis of the coil of the inductor 63 is parallel to the x-axis, and the winding axis of the coil of the inductor 53 is parallel to the z-axis. Note that each of the inductors 63 and 53 may be a chip inductor disposed on the main surface of the module substrate 91 or may be formed by a conductor pattern incorporated in the module substrate 91.

With this, the magnetic field coupling between the inductor 63 and the inductor 53 may be suppressed. Thus, it is possible to suppress a noise component in the reception band of the communication band A, flowing in from the transmission input terminal 130, to flow into the reception path to transport a reception signal in the communication band A, without necessarily passing through the band elimination filter 62 due to the magnetic field coupling of the inductor 63 and the inductor 53.

Note that the winding axis of the coil of the inductor 63 and the winding axis of the coil of the inductor 53 are not necessarily orthogonal to each other, but only need to be provided at positions not parallel to each other. Thus, in comparison with a case that the winding axis of the coil of the inductor 63 and the winding axis of the coil of the inductor 53 are parallel to each other, it is possible to suppress a noise component in the reception band of the communication band A, flowing in from the transmission input terminal 130, to flow into the reception path to transport a reception signal in the communication band A, without necessarily passing through the band elimination filter 62 due to the magnetic field coupling of the inductor 63 and the inductor 53.

8 Component Arrangement of Radio Frequency Module 1B

Figure 8:
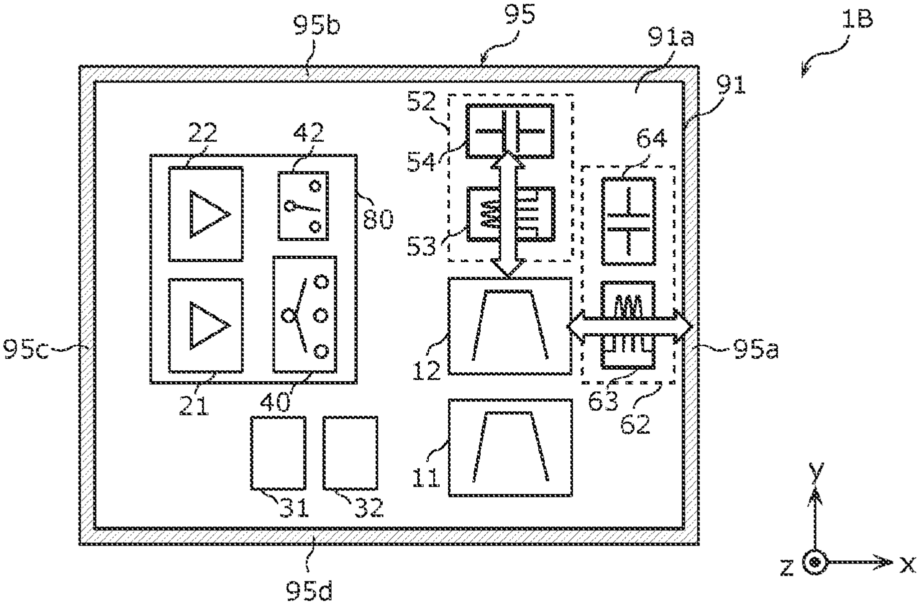
FIG. 8 is a plan view of a radio frequency module according to Modification 4 of the embodiment.

FIG. 8 is a plan view of a radio frequency module 1B according to Modification 4 of the embodiment. As illustrated in FIG. 8, the radio frequency module 1B further includes the module substrate 91 and a metal shield layer 95 in addition to the circuit components constituting the circuit illustrated in FIG. 1. The radio frequency module 1B according to the present modification is different from the radio frequency module 1 according to the embodiment in that the metal shield layer 95 is added. Hereinafter, with respect to the radio frequency module 1B according to the present modification, a description of the same points as those of the radio frequency module 1 according to the embodiment will be omitted, and different points will mainly be described.

Although not illustrated in FIG. 8, a resin member is disposed to cover the main surface 91*a* and the circuit components disposed on the main surface 91*a*.

The metal shield layer 95 is formed to be in contact with an outer surface of the resin member and a side surface of the module substrate 91. The metal shield layer 95 is set to ground electric potential, and is configured of a top surface (shield surface 95*e* (not illustrated)) perpendicular to the z-axis, two side surfaces (shield surfaces 95*a* and 95*c*) perpendicular to the x-axis, and two side surfaces (shield surfaces 95*b* and 95*d*) perpendicular to the y-axis.

Here, the winding axis of the coil constituting the inductor 63 is orthogonal to the shield surface 95*a* closest to the inductor 63. As illustrated in FIG. 8, the winding axis of the coil of the inductor 63 is parallel to the x-axis, and the shield surface 95*a* is parallel to the y-axis. Note that each of the inductors 63 and 53 may be a chip inductor disposed on the main surface of the module substrate 91 or may be formed by a conductor pattern incorporated in the module substrate 91.

Note that, in the present modification, it is sufficient that the winding axis of the coil constituting the inductor 53 is not parallel to the x-axis.

With this, since the magnetic flux generated by the inductor 63 is converged into the shield surface 95*a*, the magnetic field coupling of the inductor 63 and the inductor 53 may be suppressed. Thus, it is possible to suppress a noise component in the reception band of the communication band A, flowing in from the transmission input terminal 130, to flow into the reception path to transport a reception signal in the communication band A due to the magnetic field coupling of the inductor 63 and the inductor 53.

Note that the winding axis of the coil of the inductor 63 and the shield surface 95*a* are not necessarily orthogonal to each other, but only need to intersect with each other. Thus, in comparison with a case that the coil winding axis of the inductor 63 is parallel to the shield surface 95*a*, it is possible to suppress a noise component in the reception band of the communication band A, flowing in from the transmission input terminal 130, to flow into the reception path to transport a reception signal in the communication band A due to the magnetic field coupling of the inductor 63 and the inductor 53.

Note that conductive member can be not disposed between the inductor 63 and the shield surface 95*a*. Thus, the magnetic flux generated by the inductor 63 is efficiently converged into the shield surface 95*a*.

Further, in the present modification, in a case that a shield surface closest to the inductor 63 is the shield surface 95*e*, the winding axis of the coil of the inductor 63 may intersect with the shield surface 95*e*. However, in the case above, the winding axis of the coil of the inductor 53 can be not parallel to the z-axis. With this, the magnetic flux generated by the inductor 63 is converged into the shield surface 95*e*, and the magnetic flux of the inductor 63 and the magnetic flux of the inductor 53 are not coupled in the shield surface 95*e*. Thus, the magnetic field coupling of the inductor 63 and the inductor 53 may be suppressed.

9 Effects and Others

As described above, the radio frequency module 1 according to the present embodiment is capable of simultaneously transporting a transmission signal in the communication band B for TDD and a reception signal in the communication band A for FDD. The radio frequency module 1 according to the present embodiment includes the antenna connection terminal 100, the transmission input terminal 130 to receive a transmission signal in the communication band B from an outside, the reception output terminal 120 to supply a reception signal in the communication band B to the outside, the reception output terminal 110 to supply a reception signal in the communication band A to the outside, the filter 12 connected to the antenna connection terminal 100 and having a pass band including the communication band B, the filter 11 connected to the antenna connection terminal 100 and having a pass band including the reception band of the communication band A, the switch 42 to change over between a connection of the filter 12 and the transmission input terminal 130, and a connection of the filter 12 and the reception output terminal 120, and the band elimination filter 62 connected between the transmission input terminal 130 and the switch 42, the band elimination filter 62 having a stop band including the reception band of the communication band A.

With this, since the band elimination filter 62, having a stop band of the reception band of the communication band A, is disposed between the transmission input terminal 130 and the switch 42, it is possible to attenuate a noise component in the reception band of the communication band A flowing in from the transmission input terminal 130. Thus, when the TDD transmission in the communication band B and the FDD reception in the communication band A are performed at the same time, the deterioration of the reception sensitivity of a reception signal in the communication band A may be suppressed. Further, the band elimination filter 62 is disposed in the transmission path of the communication band B between the transmission input terminal 130 and the switch 42, and is not disposed in the reception path of the communication band B. Thus, an increase in transport loss, due to the band elimination filter 62, of a reception signal in the communication band B may be avoided.

Further, for example, the radio frequency module 1 according to the present embodiment may further include a band elimination filter 52 having a stop band of a predetermined frequency band whose frequency does not overlap with the communication band B, and the band elimination filter 52 may be connected between the filter 12 and the switch 42.

With this, a noise component in the predetermined frequency band may be eliminated from a transmission signal inputted from the transmission input terminal 130. Thus, it is possible to suppress the deterioration of the signal quality of a transmission signal in the communication band B outputted from the antenna connection terminal 100. Further, it is possible to eliminate a noise component in the predetermined frequency band from a reception signal in the communication band B inputted from the antenna connection terminal 100. Thus, it is possible to suppress the deterioration of the reception sensitivity of a reception signal in the communication band B, the reception signal being inputted from the antenna connection terminal 100, passing through the filter 12 and the switch 42, and being outputted from the reception output terminal 120.

Further, for example, the radio frequency module 6 according to Modification 1 may further include the band elimination filter 72 having a stop band of a predetermined frequency band whose frequency does not overlap with the communication band B, and the band elimination filter 72 may be connected between the switch 42 and the reception output terminal 120.

With this, it is possible to eliminate a noise component in the predetermined frequency band from a reception signal in the communication band B inputted from the antenna connection terminal 100. Thus, it is possible to suppress the deterioration of the reception sensitivity of a reception signal in the communication band B, the reception signal being inputted from the antenna connection terminal 100, passing through the filter 12 and the switch 42, and being outputted from the reception output terminal 120. Further, the band elimination filter 72 is disposed in the reception path of the communication band B between the switch 42 and the reception output terminal 120, and is not disposed in the transmission path of the communication band B. With this, an increase in transport loss, due to the band elimination filter 72, of a transmission signal in the communication band B may be avoided.

Further, for example, it is acceptable that the radio frequency module 1 according to the present embodiment further includes the module substrate 91 on which the filters 11 and 12 and the switch 42 are arranged, the band elimination filter 62 includes the inductor 63 disposed on the module substrate 91, the band elimination filter 52 includes the inductor 53 disposed on the module substrate 91, and the winding axis of the coil constituting the inductor 63 and the winding axis of the coil constituting the inductor 53 are not parallel to each other.

With this, the magnetic field coupling between the inductor 63 and the inductor 53 may be suppressed. Thus, it is possible to suppress a noise component in the reception band of the communication band A, flowing in from the transmission input terminal 130, to flow into the reception path to transport a reception signal in the communication band A, without necessarily passing through the band elimination filter 62 due to the magnetic field coupling of the inductor 63 and the inductor 53.

Further, for example, it is acceptable that: the radio frequency module 1B according to Modification 4 further includes the module substrate 91 on which the filters 11 and 12 and the switch 42 are arranged, a resin member disposed on the main surface of the module substrate 91 and covering at least one of the filters 11 and 12 and the switch 42, and the metal shield layer 95 formed on an outer surface of the resin member; the band elimination filter 62 includes the inductor 63 disposed on the main surface of the module substrate 91; the band elimination filter 52 includes the inductor 53 disposed on the module substrate 91; and the winding axis of the coil constituting the inductor 63 intersects with the shield surface 95*a*, among the multiple shield surfaces constituting the metal shield layer 95, closest to the inductor 63.

With this, since the magnetic flux generated by the inductor 63 is converged into the shield surface 95*a*, the magnetic field coupling of the inductor 63 and the inductor 53 may be suppressed. Thus, it is possible to suppress a noise component in the reception band of the communication band A, flowing in from the transmission input terminal 130, to flow into the reception path to transport a reception signal in the communication band A, without necessarily passing through the band elimination filter 62 due to the magnetic field coupling of the inductor 63 and the inductor 53.

Further, for example, the radio frequency module 1 according to the present embodiment may further include the low-noise amplifier 22 that is connected between the switch 42 and the reception output terminal 120 and amplifies a reception signal in the communication band B, and the low-noise amplifier 21 that is connected between the filter 11 and the reception output terminal 110 and amplifies a reception signal in the communication band A.

With this, since the low-noise amplifiers 21 and 22 are included in the radio frequency module 1, the reception paths of the communication bands A and B may be shortened, and the transport loss of reception signals in the communication bands A and B may be reduced.

Further, for example, the radio frequency module 8 according to Modification 2 may further include the reception path to transport a reception signal in the communication band C, the inductors 81 and 82 connected to the input terminal of the low-noise amplifier 22, and the switch circuit to change over between (1) a connection of the switch 42, the inductor 81, and the input terminal of the low-noise amplifier 22, and (2) a connection of the reception path described above, the inductor 82, and the input terminal of the low-noise amplifier 22.

With this, it is possible to optimize the impedance matching element (inductor) for matching the input impedance of the low-noise amplifier 22 in accordance with the frequency band of a reception signal transported through the radio frequency module 8. In particular, since the impedance matching element can be customized in accordance with a reception signal in the communication band B, it is possible to decrease a noise figure in the communication band B being a wide band for TDD.

Further, for example, the radio frequency module 1 according to the present embodiment may further include the switch 40 to change over between a connection and a disconnection of the antenna connection terminal 100 and the filter 12, and to change over between a connection and a disconnection of the antenna connection terminal 100 and the filter 11.

With this, for example, in a case of the sole transport of a signal in the communication band A and the sole transport of a signal in the communication band B, the isolation from the signal path of the other communication band may be improved.

Further, for example, in the radio frequency module 1 according to the present embodiment, the communication band B may be Band B41 for 4GLTE, and the communication band A may be Band B3 for 4GLTE.

Further, for example, in the radio frequency module 1 according to the present embodiment, the predetermined frequency band described above may be a band including at least one of Bands n77 and n79 for 5GNR.

Further, the communication device 5 according to the present embodiment includes the RFIC 3 to process a radio frequency signal, and the radio frequency module 1 to transport a radio frequency signal between the RFIC 3 and the antenna 2.

With this, the communication device 5 may achieve the same effects as the above-described effects of the radio frequency module 1.

Other Embodiments

Although the radio frequency module and the communication device according to the present disclosure have been described based on the embodiments and the modifications, the radio frequency module and the communication device according to the present disclosure are not limited to the embodiments and the modifications described above. Other embodiments realized by combining the desired constituents of the embodiments and modifications, modifications obtained by applying various changes that those skilled in the art conceive with respect to the embodiments and modifications within the scope of the present disclosure, and various apparatuses that include the radio frequency module and the communication device are also included in the present disclosure.

For example, in the component arrangement configuration of the radio frequency module according to the embodiment, the circuit components constituting the radio frequency module are arranged on one main surface of the module substrate 91, but the circuit components constituting the radio frequency module may be divided and arranged on the first main surface and the second main surface, which are opposed to each other, of the module substrate. That is, the circuit components constituting the radio frequency module may be mounted on one surface of the module substrate, or may be mounted on both surfaces thereof.

For example, in the circuit configuration of the radio frequency module and the communication device according to the embodiment and the modifications, another circuit element, a wiring line, or the like may be inserted between paths connecting the circuit elements and the signal paths illustrated in the drawings. For example, in the embodiment and the modifications, a filter or a matching circuit may be inserted between the antenna connection terminal 100 and the switch 40.

INDUSTRIAL APPLICABILITY

The present disclosure may widely be used as a radio frequency module disposed in a front end portion in a communication apparatus, such as a mobile phone.

REFERENCE SIGNS LIST

1, 1A, 1B, 6, 8 RADIO FREQUENCY MODULE
2 ANTENNA
3 RF SIGNAL PROCESSING CIRCUIT (RFIC)
4 BASEBAND SIGNAL PROCESSING CIRCUIT (BBIC)
5, 7 COMMUNICATION DEVICE
11, 12 FILTER
21, 22 LOW-NOISE AMPLIFIER
31, 32 MATCHING CIRCUIT
40, 42, 43, 44, 45, 46 SWITCH
40*a*, 42*a* COMMON TERMINAL
40*b*, 40*c*, 42*b*, 42*c* SELECTION TERMINAL
52, 62, 72 BAND ELIMINATION FILTER
53, 63, 81, 82 INDUCTOR
54, 64 CAPACITOR
80 SEMICONDUCTOR INTEGRATED CIRCUIT (SEMICONDUCTOR IC)
83 BYPASS PATH
91 MODULE SUBSTRATE
91*a* MAIN SURFACE
95 METAL SHIELD LAYER
95*a*, 95*b*, 95*c*, 95*d*, 95*e* SHIELD SURFACE
100 ANTENNA CONNECTION TERMINAL
110, 120 RECEPTION OUTPUT TERMINAL
130 TRANSMISSION INPUT TERMINAL
521, 522, 621, 622 INPUT/OUTPUT TERMINAL

The invention claimed is:

1. A radio frequency module configured to simultaneously transport a transmission signal in a first communication band for time division duplex (TDD) and a reception signal in a second communication band for frequency division duplex (FDD), the radio frequency module comprising:
- an antenna connection terminal;
- a first transmission input terminal configured to receive an external transmission signal in the first communication band;
- a first reception output terminal configured to externally supply a reception signal in the first communication band;
- a second reception output terminal configured to externally supply a reception signal in the second communication band;
- a first filter connected to the antenna connection terminal, the first filter having a pass band that comprises the first communication band;
- a second filter connected to the antenna connection terminal, the second filter having a pass band that comprises a reception band of the second communication band;
- a first switch configured to selectively connect the first filter to the first transmission input terminal or to the first reception output terminal; and
- a first band elimination filter connected between the first transmission input terminal and the first switch, the first band elimination filter having a stop band configured to eliminate the reception band of the second communication band.

2. The radio frequency module according to claim 1, further comprising:
- a second band elimination filter having a stop band configured to eliminate a predetermined frequency band that does not overlap with the first communication band,
- wherein the second band elimination filter is connected either between the first filter and the first switch or between the first switch and the first reception output terminal.

3. The radio frequency module according to claim 2, further comprising:
- a module substrate on which the first filter, the second filter, and the first switch are arranged,
- wherein the first band elimination filter comprises a first inductor on the module substrate,
- wherein the second band elimination filter comprises a second inductor on the module substrate, and
- wherein a winding axis of a coil of the first inductor and a winding axis of a coil of the second inductor are not parallel to each other.

4. The radio frequency module according to claim 2, further comprising:
- a module substrate on which the first filter, the second filter, and the first switch are arranged;
- a resin on a main surface of the module substrate, the resin covering at least the first filter, the second filter, or the first switch; and
- a metal shield layer on an outer surface of the resin,
- wherein the first band elimination filter comprises a first inductor on the main surface of the module substrate,
- wherein the second band elimination filter comprises a second inductor on the module substrate, and
- wherein a winding axis of a coil of the first inductor intersects with a shield surface of the metal shield layer that is closest to the first inductor.

5. The radio frequency module according to claim 1, further comprising:
- a first low-noise amplifier connected between the first switch and the first reception output terminal, and configured to amplify a reception signal in the first communication band; and
- a second low-noise amplifier connected between the second filter and the second reception output terminal, and configured to amplify a reception signal in the second communication band.

6. The radio frequency module according to claim 5, further comprising:

a reception path configured to transport a reception signal in a third communication band;

a first impedance matching circuit element and a second impedance matching circuit element that are connected to an input terminal of the first low-noise amplifier; and a switch circuit configured to selectively connect the first switch, the first impedance matching circuit element, and an input terminal of the first low-noise amplifier to each other, or the reception path, the second impedance matching circuit element, and the input terminal of the first low-noise amplifier to each other.

7. The radio frequency module according to claim 1, further comprising:

a second switch configured to selectively connect the antenna connection terminal to the first filter or to the second filter.

8. The radio frequency module according to claim 1, wherein the first communication band is Band B41 for 4th Generation Long Term Evolution (4GLTE), and wherein the second communication band is Band B3 for 4GLTE.

9. The radio frequency module according to claim 2, wherein the predetermined frequency band comprises at least Band n77 or Band n79 for 5th Generation New Radio (5GNR).

10. A communication device, comprising:

a signal processing circuit configured to process a radio frequency signal; and the radio frequency module according to claim 1 configured to transport the radio frequency signal between the signal processing circuit and an antenna.

* * * * *